United States Patent [19]

Hori

[11] Patent Number: 5,739,850
[45] Date of Patent: Apr. 14, 1998

[54] APPARATUS FOR IMPROVING THE IMAGE AND SOUND PROCESSING CAPABILITIES OF A CAMERA

[75] Inventor: Masashi Hori, Yokohama, Japan

[73] Assignee: Canon Kabushiki Kaisha, Tokyo, Japan

[21] Appl. No.: 649,112

[22] Filed: May 14, 1996

Related U.S. Application Data

[63] Continuation of Ser. No. 346,022, Nov. 29, 1994, abandoned.

[30] Foreign Application Priority Data

Nov. 30, 1993 [JP] Japan ................................. 5-299785
Dec. 24, 1993 [JP] Japan ................................. 5-328034

[51] Int. Cl.$^6$ ................................................. H04N 5/76
[52] U.S. Cl. ........................... 348/231; 348/233; 348/232; 358/909.1
[58] Field of Search ...................... 348/222, 231, 348/232, 233, 239; 358/906, 909.1; H04N 5/228, 5/76, 5/765

[56] References Cited

U.S. PATENT DOCUMENTS 5,153,730  10/1992  Nagasaki ............................ 348/231
5,226,145   7/1993  Moronaga .......................... 348/231
5,262,868  11/1993  Kaneko .............................. 348/233
5,376,965  12/1994  Nagasaki ............................ 348/232
5,535,011   7/1996  Yamagami .......................... 348/211

OTHER PUBLICATIONS

Draft International Standard ISO/IEC DIS 10918-1, International Organization for Standardization/International Electrotechnical Commission, Information technology—digital compression and coding of continuous–tone still images—Part 1: Requirements and Guidelines, ©1991.

Primary Examiner—Sherrie Hsia
Attorney, Agent, or Firm—Morgan & Finnegan LLP

[57] ABSTRACT

The image pickup apparatus has a camera which encodes object image data, further comprises a recording unit 101 for recording image data, a connector 200 for connecting the camera with an expansion card 111 including a signal processor 701 for processing image data stored in the recording unit 101, and a memory and bus controller 102 for controlling image data, and the signal processor 701 controls so that program data transmitted from the camera 100 is written in a flash ROM 703 via an expansion bus interface 201.

37 Claims, 10 Drawing Sheets

FLOWCHART OF AUTOMATIC CHARACTER RECOGNITION

FLOWCHART OF A PROCESS OF SEARCHING IMAGES

APPARATUS FOR IMPROVING THE IMAGE AND SOUND PROCESSING CAPABILITIES OF A CAMERA

This is a continuation of application Ser. No. 08/346,022, filed on Nov. 29, 1994 now abandoned.

BACKGROUND OF THE INVENTION

Present invention relates to an image pickup apparatus and, more particularly, to an image pickup apparatus coupled to an external computer which processes and records picked-up images and sounds, and replays the images.

Conventionally, character recognition software installed in a personal computer as an application recognizes characters by analyzing image data of an original scanned by a flat bed scanner or the like, then outputs data as a text file. Furthermore, there is developed a digital electronic still camera which records an image in a digital record medium, such as a semi-conductor memory card and a compact hard disc, as digital signals. The digital record medium is constructed so that data is read by a personal computer.

The digital electronic still camera records the image in the record medium in a data format which can be recognized by employing the character recognition software, (e.g., Tag Image File Format (TIFF), Joint Photographic Image Coding Expert Group (JPEG), thereby it is possible to input the image file, based on the picked up image, which is stored in the digital record medium to a personal computer to recognize characters by executing a character recognition software, and output the result as text.

The structure of the above-described electronic still camera is shown in FIG. 10. Below, conventional technology is explained with reference to FIG. 10. In FIG. 10, the digital electronic camera 800 is an electronic still camera employing Japan Electronic Industry Development Association's (JEIDA's) digital camera format, and a record medium 801 is a memory card conforming to Personal Computer Memory Card International Association (PCMCIA) standard, for instance. In the digital electronic camera 800, an image pickup lens 1, an diaphragm-and-shutter 2 having function of an iris diaphragm and a shutter, a stroboscope 3, mechanical and operational unit control CPU 4 for controlling operational unit and mechanical parts of the apparatus, and mechanical part driving circuit 5 for driving each mechanical part of the apparatus are set for picking up an image of an object. Then the image of the object is electrically processed by an imaging element 6 which converts reflected light from the object (optical image) into electrical signals, a timing signal generator 7 (called "TG" as timing generator, hereinafter) for generating a timing signal which is necessary to drive the imaging element 6, an imaging element driving circuit 8 for amplifying the signal from the TG 7 to the level where the imaging element 6 is to be driven, preprocessor 9 comprising CDS circuit for removing output noises generated by the imaging element 6 and a nonlinear amplifier which amplifies the image before an analog-digital conversion, an analog-digital converter (A/D converter) 10, a buffer memory 12 for storing the display image, a signal processor control CPU 13 for controlling signal processors, an operation display 14 for displaying the image to support operation means and state of a camera, and operational unit 15 for externally controlling the camera. Further, the digital electronic camera 800 and the memory card 801 are connected via a memory controller 802, a digital signal processor 803 for converting the format of the output result from the imaging element 6 into the format suitable for recording in the memory card 801, and a memory card I/F 804 for transmitting the signal from the digital signal processor 803 to the memory card 801.

Next, an operation of a conventional digital electronic camera will be described.

First, a user operates the operational unit 15 and a camera starts picking-up an image, and lenses are controlled by the mechanical and operational unit control CPU 4 and the mechanical part driving circuit 5 on the basis of the user's designation. At this time, state of the camera is displayed on the operation display 14 in order to notify the user the state of the camera. Further, a brightness measuring circuit (not shown) measures brightness of the object, then a diaphragm value and a shutter speed of the diaphragm-and-shutter 2 are set by the mechanical and operational unit control CPU 4 in accordance with the measured brightness. The mechanical part driving circuit 5 drives the diaphragm-and-shutter 2 in accordance with the control values, namely the diaphragm value and the shutter speed, set by the mechanical and operational unit control CPU 4. Further, the image may be taken by flashing the stroboscope 3 depending upon the value from the brightness measuring circuit (not shown). As described above, the object is exposed, and reflected light from the object goes into the imaging element 6 through the image pickup lens 1 and the diaphragm-and-shutter 2. The diaphragm-and-shutter 2 controls the amount of in-coming light to the imaging element 6 as well as preventing signal charge from influence of the in-coming light during transmission of the image when an interlace reading type charge-coupled device (CCD) is used as the imaging element. The imaging element 6 is driven in accordance with the driving signal, an amplified output of the TG 7, by the imaging element driving circuit 8. TG 7 operation is controlled by the signal processing control unit CPU 13. The output from the imaging element which is driven as described above is sent to the pre-processor 9. The pre-processor 9 performs γ-correction, separation of color signal forming, and white balancing on the image signal, further performs CDS process for removing low frequency noises included in the output from the imaging element, and also performs non-linearization of the image pick-up element output for efficient use of the dynamic range of the A/D converter. The pre-processed image signal is converted into a digital signal by the A/D converter 10, then inputted into the memory controller 802. At the memory controller 802, the digitized image data is temporarily stored in the buffer memory 12 in accordance with the control signal from the signal processor control CPU 13, and subsequently read the image data in predetermined order which is determined depending on, for example, construction of the color filters of the imaging element. The read digital image data is compressed, encoded, and changed to data in a predetermined format by the digital signal processor 803, then transmitted to the memory card 801 via the memory card I/F 804 and recorded there. JPEG method (described in ISO/IEC DIS 10918-1) which is prescribed as an International Standard method can be used as a method of encoding a still image. The conventional digital electronics camera processes the image of the object by performing aforesaid operation.

The above-described conventional image pickup apparatus, such as a scanner and an electronic still camera, is constructed so that it utilizes the character recognition software for reading an image file and recognizing it as characters, or executes the driving software for driving the scanner to obtain image data, then recognizes it as characters. When an image is read by a scanner for character recognition, a plurality of read files are made for character recognition. The user can name a plurality of files so that the user can easily know the contents of the files later. Therefore, it is not difficult to designate one of those files when the user is executing the character recognition software. In a case where image data is received directly from a scanner driven by executing a character recognition software, data for character recognition delimited since the user sets an original whose characters are to be recognized on the scanner.

According to the utilization process as described above, reading an original by a scanner and character recognition by the character recognition software are performed at almost the same time, thus there will be little difficulties, for a user, to provide and designate data of characters to be recognized by the character recognition software.

However, when an image taken by the conventional digital electronic still camera is recognized by executing the character recognition software, there are problems as described below.

When a user takes an image including characters to be recognized by using the digital electronic still camera, the user can not name the image file, thus the user has to check all of the image files including natural picture images and images on which the character recognition is to be performed in order to find the file for the character recognition, then the image files including characters to be recognized have to be read by executing the character recognition software. This is a time and energy consuming process. Furthermore, there may be a considerable time interval between when the user took an image and when a personal computer start operating character recognition process, thus it may not be easy for the user to designate which file or files needs/need to be used.

Further, all of the common natural picture images taken by the user and the files for the character recognition can be processed successively by executing the character recognition software, however, time will be wasted for making the character recognition software analyze the natural picture image. Accordingly, the system is very inconvenient.

Further, the conventional digital electronic still camera can not inputted a character recognition function as well as sound recognition function, or convert and process sound into character data.

SUMMARY OF THE INVENTION

The present invention has been made in consideration of the above situation, and has its object to provide a recording and replaying apparatus which automatically and efficiently performs character recognition of an image taken by an apparatus, such as a digital electronic still camera, by executing a character recognition software.

Another object is to provide a user friendly image pickup apparatus which is compact, low in price, and easy to use, and which is easily portable and easy to expand and add functions by making an expansion card having a character recognition apparatus or the like detachable.

According to the present invention, the foregoing object is attained by providing an image pickup apparatus having a camera which encodes an object image into object image data, comprises: recording means for recording the image data; connecting means for connecting a unit having a signal processing circuit which processes image data stored in the recording means; and a branching means for determining selection of either the camera or the recording means from which the object image data is transmitted via the connecting means when the unit is connected.

The foregoing object is also attained by providing an image pickup apparatus having a camera which encodes sound data, comprising: recording means for recording the sound data; connecting means for connecting a unit having a signal processing circuit which encodes the sound data stored in the recording means; and a branching means for determining selection of either the camera or the recording means from which the sound data is transmitted via the connecting means when the unit is connected.

Further, the foregoing object is also attained by providing an image pickup apparatus for inputting sound data as well as image data, comprising: image processing means for converting the image data into digital data; and sound processing means for converting the sound data into digital data, wherein the digitized image and sound data are combined and recorded.

Further, the foregoing object is attained by providing a recording apparatus comprising recording means for recording image data and operation means capable of adding predetermined information to the image data file in order to automatically detect files on which a predetermined process is executed among image data files to be stored in the recording means, further comprising another operation means capable of detecting image data files which is recorded with additional information and performing predetermined processes.

Further, the foregoing object is attained by providing a recording and replaying apparatus, comprising: recording means for recording the image data; first operation means for adding specific information to files on which first predetermined process is performed so that those files can be automatically detected out of image data files stored in said recording means; and second operation means for detecting the image data files recorded with the specific information by said first operation means, and performing second predetermined process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will be described in detail in accordance with the accompanying drawings.

Figure 1:
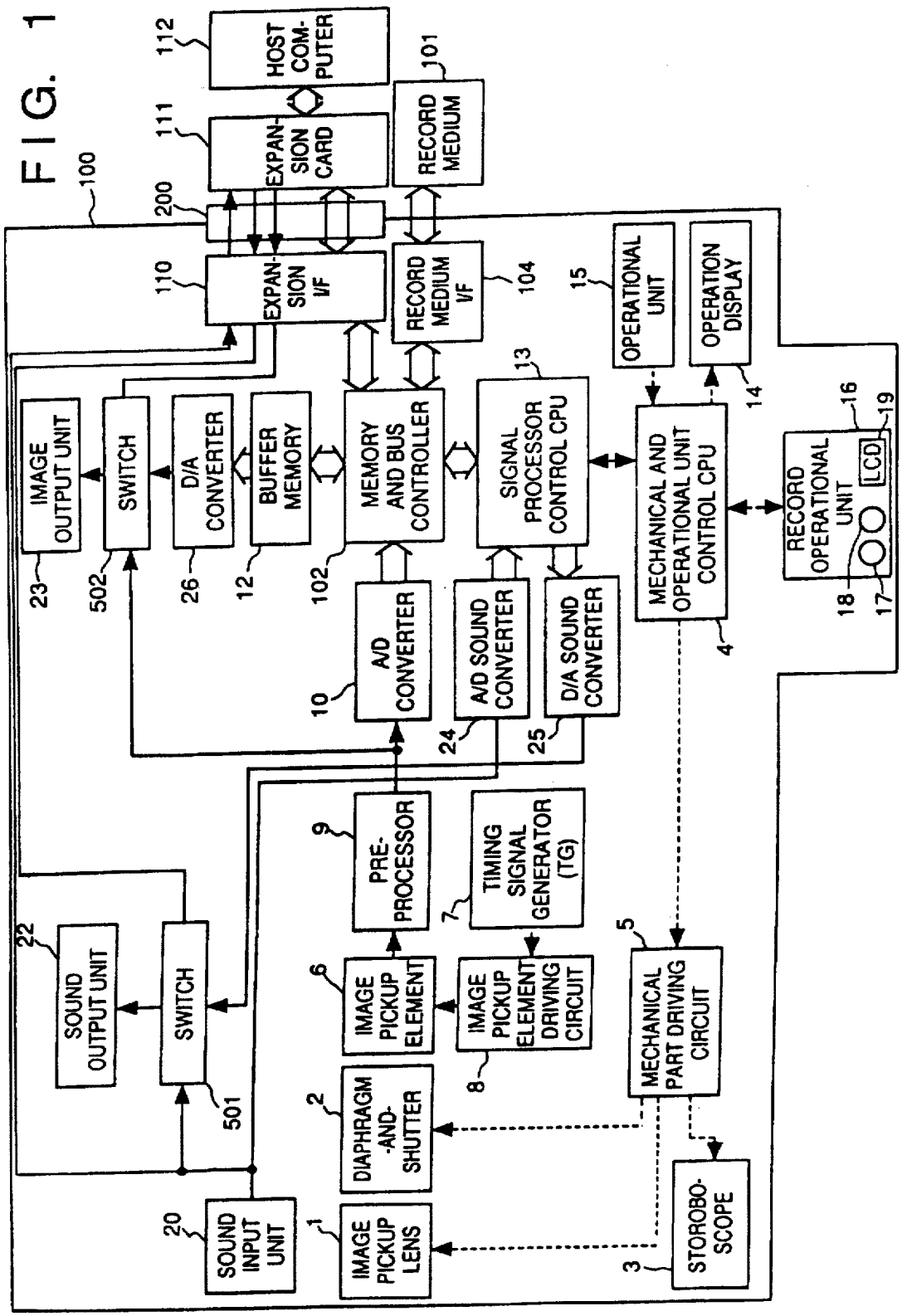
FIG. 1 is a block diagram showing a configuration of a digital electronic camera according to an embodiment of the present invention.
Figure 2:
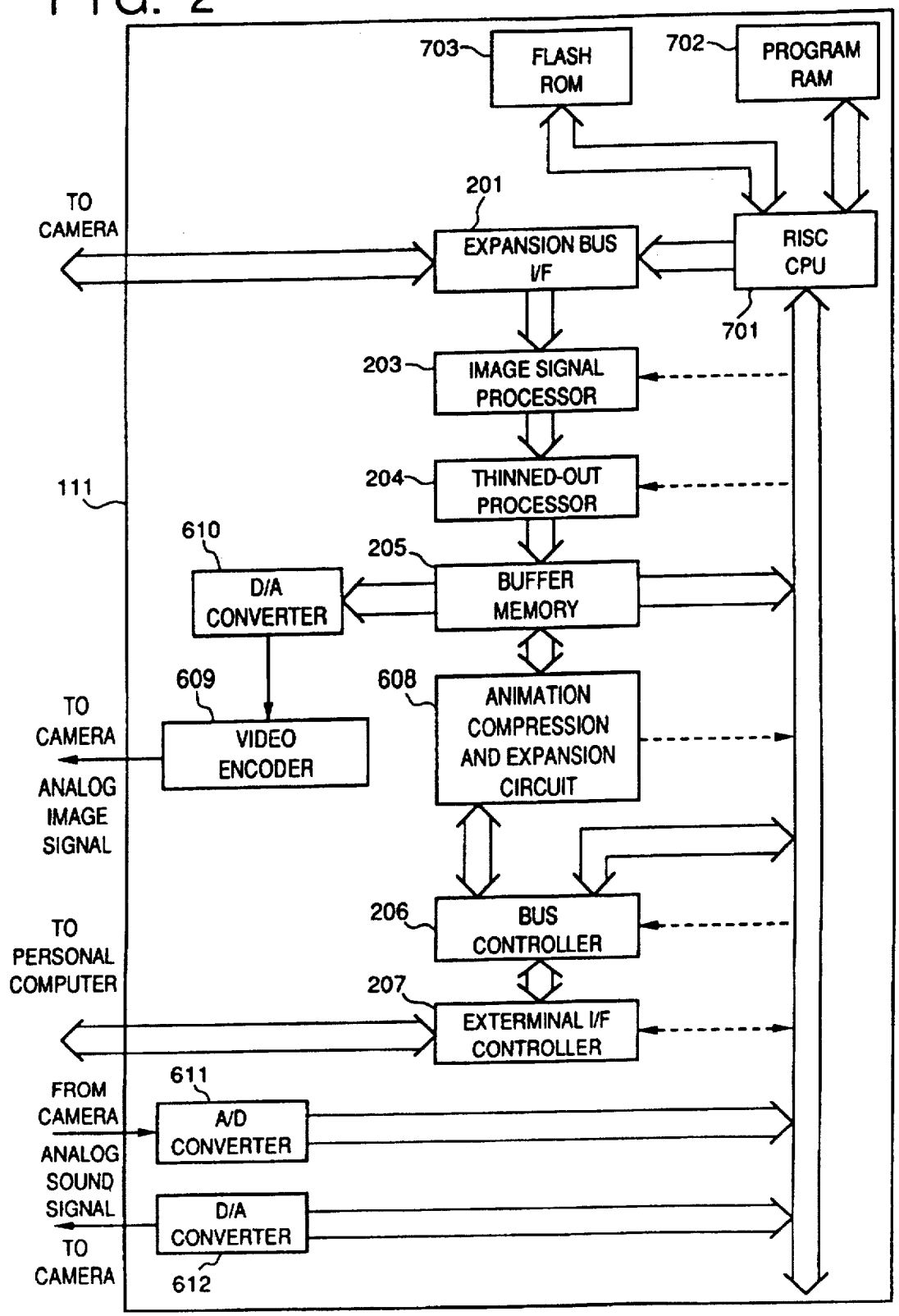
FIG. 2 is a block diagram illustrating an expansion card according to the embodiment.

A digital electronic camera according to the embodiment comprises an interface for a record medium to exchange data between the record medium and the camera, an image signal processor, a data compressor, an expansion card interface having controller for interfacing with an external device, and a connector for connecting the camera and the expansion card. The digital electronic camera of the embodiment has the minimum functions for being used as a digital electronic camera when the expansion card is not attached. However, by attaching the expansion card, image and sound processing abilities dramatically improve and a function for accessing an external interface is provided, thus a superior system can be constructed. FIG. 1 and FIG. 2 are block diagrams of the digital electronic camera and the expansion card, respectively.

Figure 10:
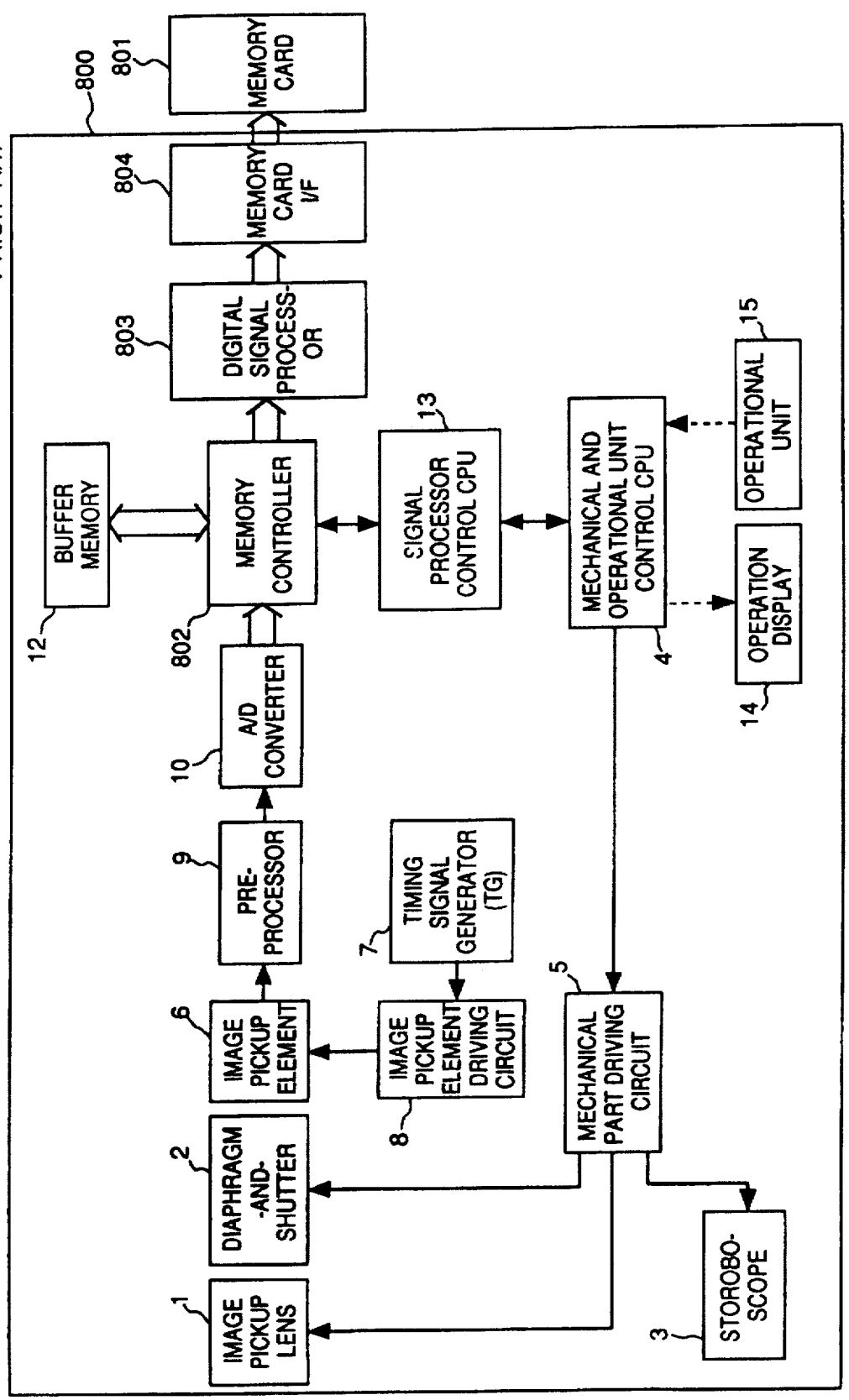
FIG. 10 is a block diagram illustrating a configuration of a conventional electronic camera.

In FIG. 1, elements which have the same function as the ones expressed in the aforesaid conventional example with reference to FIG. 10 are given the same reference numerals as in FIG. 10, and the explanation of these elements will be omitted.

Record medium 101 can be a memory card or a hard disk of the PCMCIA standard. A file format of the record medium follows DOS file system standard by JEIDA, for example. Further, a record medium I/F 104 is an interface of JEIDA standard or the like, and composed of logic circuits and interface connectors. Compressed encoded data is stored in the record medium 101 in accordance with an interface protocol. Further, the sound input unit 20 and the sound output unit 22 can be audio jack and speakers, respectively. An A/D sound converter 24 converts an electrical signal which is converted from a sound signal to a digital signal, and a D/A sound converter 25 converts a signal from the signal processor control CPU 13 controlling various kinds of signals into an analog signal. A switch 501 is a selection circuit for the sound signal to be outputted to the sound output unit 22. A memory and bus controller 102 transmits image and sound data to the signal processor control CPU 13, an expansion card 111, and the record medium 101 as well as transmits the image data to the buffer memory 12 for display.

A D/A converter 26 converts a digital image signal from the buffer memory 12 to an analog image signal for display. An image output unit 23 is an image display device which displays an image based on image signals inputted via a switch 502. The switch 502 is a selection circuit for an image signal to be outputted to the image output unit 23. An expansion I/F 110 is an interface circuit between the expansion card 111 and the main body of the camera 100 (called "camera 100" hereinafter). The expansion I/F 110 and the expansion card 111 are constructed so as to be connected with each other via a connector 200. The connector 200 is used when a sound data control program, an image control program or the like is changed by using a host computer 112.

The camera 100 has a record operational unit 16 which comprises a character recognition mode setting button 18, a switch button 17 for initiating a release operation, and an external liquid crystal display (LCD) 19 for displaying the mode or the like.

With the construction as described above, it is possible to transmit data converted in accordance with a predetermined equations, to record data received from an external interface in the record medium 101 after converting the form of the data, and to transmits data to the external interface after converting the form of data.

FIG. 2 is a block diagram illustrating a configuration of the expansion card according to the embodiment.

In FIG. 2, a RISC CPU 701 is a Reduced Instruction Set Computer (RISC) processor capable of high speed operation, and a program RAM 702 is a RAM for storing an operational program for the RISC CPU 701, further, a flash ROM 703 is a lump erasing type ROM for storing Basic Input/Output System (BIOS) of the RISC CPU 701. The RISC CPU 701 interchanges data with the expansion I/F 110 of the camera 100 by using an expansion bus I/F 201 via the connector 200. Further, the RISC CPU 701 outputs a digital image signal from the camera 100 which is transmitted via the expansion bus I/F 201 to a image signal processor 203. The digital image signal is converted into a standard component video signal (e.g., a RGB signal) in the image signal processor 203, then outputted to a thinning-out processor 204. After the converted signals are thinned-out (to one-eighth of the original image in horizontal and vertical directions, for instance), the thinning-out processor 204 transfers signals to a buffer memory 205. The image signals temporarily stored in the buffer memory 205 are transmitted to a video encoder 609 via a D/A converter 610, then outputted to the camera 100 as analog signals by following control instructions from the CPU 701. Meanwhile, the buffer memory 205 transfers the image data to an animation compression/expansion circuit 608 in accordance with a control instruction from the CPU 701. At the animation compression/expansion circuit 608, the image data is compressed or expanded as needed, then transmitted to a bus controller 206. The bus controller 206 transfers the compressed or expanded image data to a device having a monitor, such as a personal computer, via an external I/F controller 207 in accordance with a control instruction from the RISC CPU 701. Accordingly, a user can confirm an image to be recorded as an animation on a monitor. An A/D converter 611 converts an image or sound signal inputted from the camera 100 into digital signals, and transfers the signal to the RISC CPU 701, whereas, a D/A converter 612 converts a signal from the RISC CPU 701 to analog signals, then transmits it to the camera 100 as an analog sound signal.

Next, an operation of the embodiment will be described with reference to FIGS. 1 and 2.

In the embodiment, the record medium 101 storing a program in BIOS level for RISC CPU 701 is attached to the camera 100 in FIG. 1, and the expansion card 111 is also attached to the camera 100 via the connector 200. Then, the content of the record medium 101 is transmitted to the expansion card 111 via the record medium I/F 104 and the expansion I/F 110, whose operations are controlled by the bus controller 102. At the expansion card 111, the program data transmitted from the camera 100 under control of the RISC CPU 701 is written to the flash ROM via the expansion bus interface 201. Accordingly, functions and capacity of the digital electronic camera, when the expansion card is attached to it, can be changed in the BIOS level, thus the functions of the camera can be dramatically increased without buying another camera for adding new functions.

Then, the record medium 101 storing an application program to be executed by the RISC CPU 701 is attached. This application program is also written to the program RAM 702 of the expansion card via the expansion bus, in the same manner as above.

As explained above, it is possible to executes various kinds of application programs on the digital electronic camera by changing application programs. In other words, by attaching the expansion card, it is possible to perform an operation such as to monitor an image based on image signals and to record sound signals and image signals from the camera simultaneously as well as to perform more sophisticated operations in accordance with the content written in the program RAM 702 and the flash ROM 703.

As programs to be written in the program RAM, there exist various kinds of programs, such as a translation program, a program for image recognition and image composition. Further, the record medium 101 to be connected with the camera 100 is used as a supplier of a processing program and BIOS in this embodiment, however, those can be supplied from a information processing device, such as a personal computer, via a Small Computer System Interface (SCSI) bus of the expansion card. Furthermore, the RISC CPU is used as a processor capable of performing high speed operation, however, other processors, such as Complex Instruction Set Computer (CISU) CPU, can replace it.

<Image and Sound Recognition>

Figure 3:
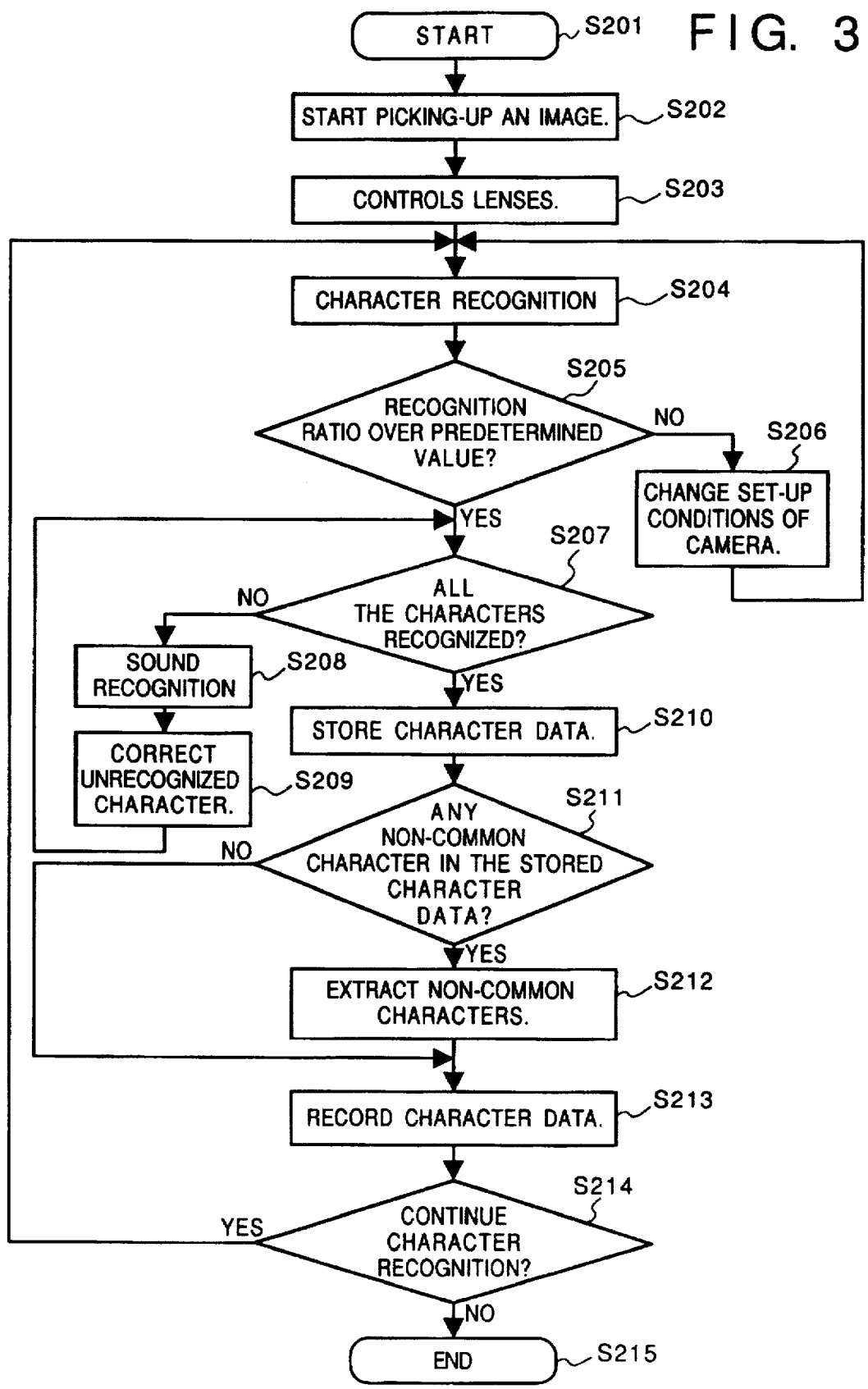
FIG. 3 is a flowchart showing an operation according to the embodiment.

Regarding a program having character and sound recognition functions as content to be written in the program RAM in the embodiment, a flowchart of the operation according to the embodiment of the present invention is shown in FIG. 3. The operation of the embodiment will be described with reference to the flowchart.

Figure 4:
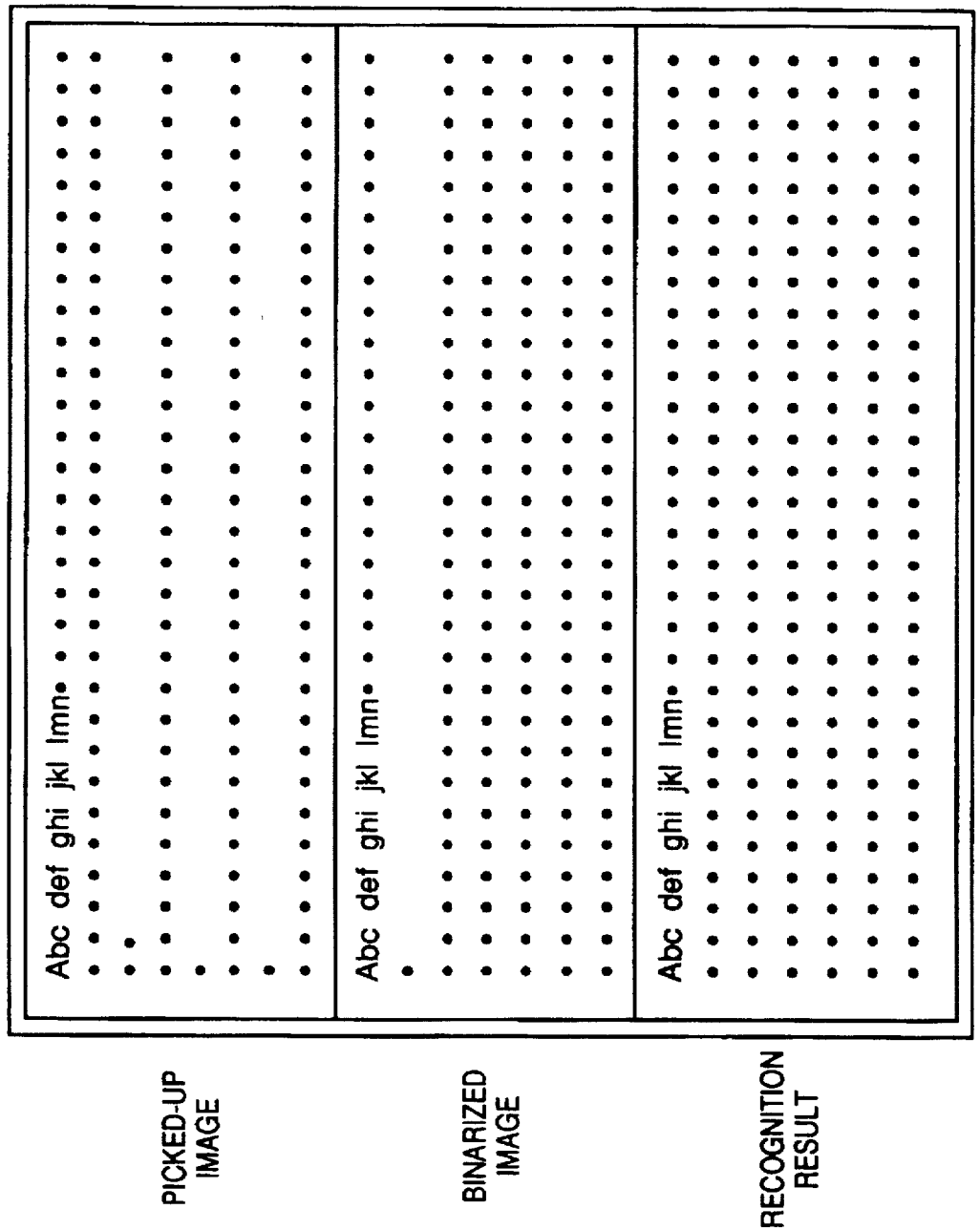
FIG. 4 illustrates a display during a character recognition process according to the embodiment.

At step S202, the camera starts picking-up an image of an object on which characters are written. At step S203, as the camera picks-up an image, operations of lenses, such as focusing and zooming, are controlled. At step S204, characters in the image being picked-up are recognized. At step S205, ratio of unrecognized characters to the total number of characters is calculated based on the result of the character recognition at step S204, and whether or not the recognition ratio is over a predetermined value is determined. If it is not (the determination result is "NO" at step S205), the process proceeds to step S206, and after set-up conditions of the camera, such as lens opening, shutter speed, and operation of a stroboscope, are changed so that the recognition ratio achieves a maximum value, then the process moves back to step S204. Note that, in a loop of steps S204 to S206, at least two kinds of images are displayed as shown in FIG. 4 among the picked-up images, the recognition results, and images in the recognition process (e.g., binarized picked-up image). Thus, by outputting a plurality kinds of images, a user can confirm which condition or conditions for taking images is/are changed to improve the recognition rate. Further, in the digital electronics camera, lack of luminance can also be displayed.

Figure 5:
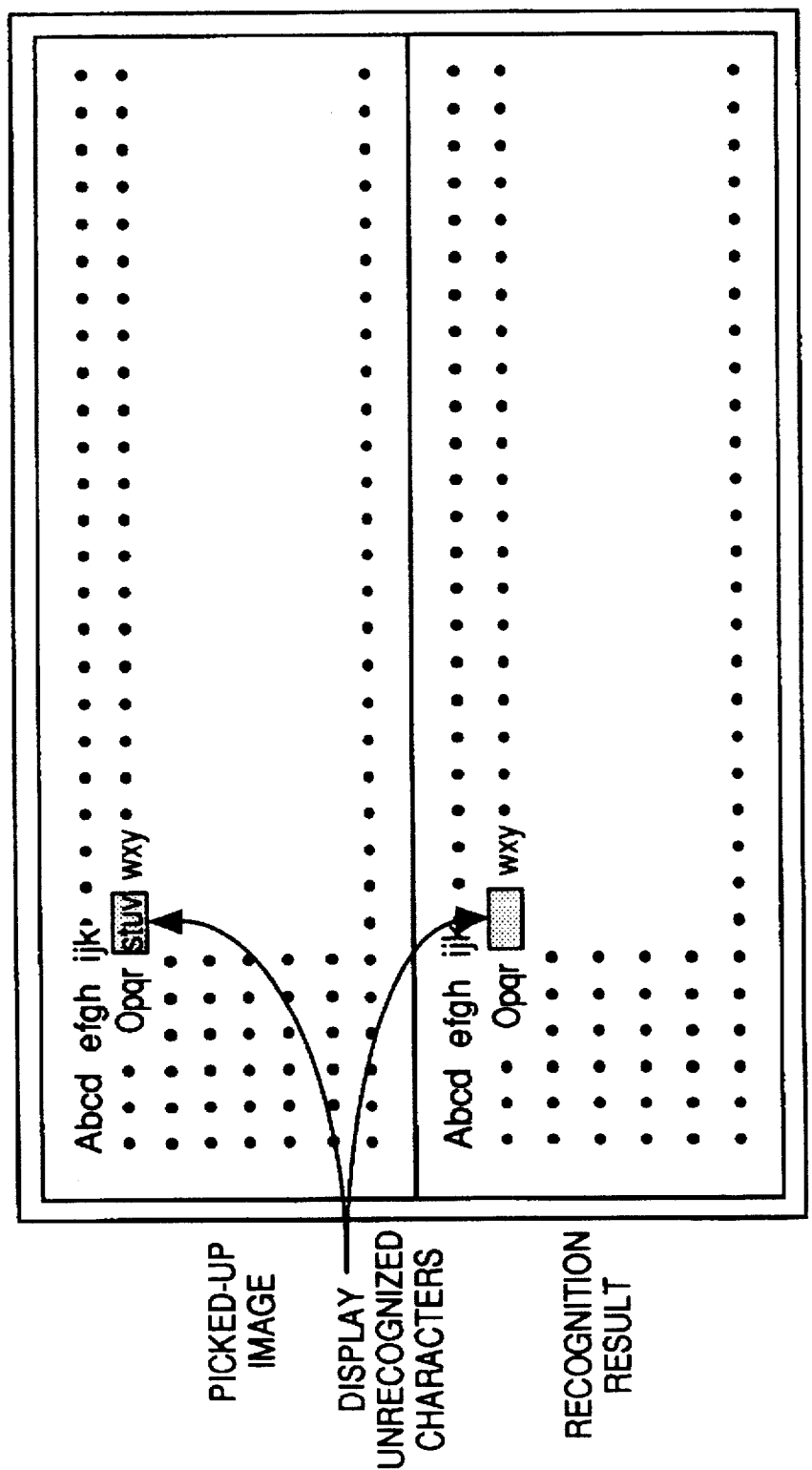
FIG. 5 illustrates a display of a character recognition result and a process for correction according to the embodiment.

At step S207, completion of recognizing the all characters in the picked-up image is checked on the basis of the recognition result when the recognition ratio is its maximum value. When the all characters are not recognized (i.e., "NO" at step S207), unrecognizable character or characters is/are displayed as shown in FIG. 5. When miss-recognized character or characters is/are found from the recognition result, a user can mark the character or characters by using a mouse, a pen, etc. At step S208, when there is/are unrecognizable and/or miss-recognized character or characters, a user pronounces the correct character or characters to replace it/them. The pronounced sound is recognize at step S209, and the unrecognized or to be corrected character or characters is/are replaced with the correct character or characters, then the process returns to step S207. Whereas, when the character recognition of the picked-up image is completed (i.e., "YES" at step S207), the process proceeds to step S210 and the character recognition result at step S207 is stored as character recognition data. At step S211, whether or not there is any non-common characters, comparison to the recognition result before the character recognition at step S210, is determined. If there is (i.e., "YES" at step S211), the process moves to step S212, and non-common characters are extracted from the character recognition data stored at step S210. After that at step S213, the non-common characters of the character recognition data are stored, and at step S214, whether or not the character recognition should be continued is determined. When the character recognition is determined to be continued at step S214 (i.e., "YES" at step S214), the process returns to step S204 and the processes S204 to S214 are repeated. Whereas the character recognition is determined to end (i.e., "NO" at step S214), the entire program of the embodiment is completed.

FIG. 4 illustrates the picked-up image, the recognition result, and one of images in the recognition process which are obtained at steps S204 to S206 shown in the flowchart in FIG. 3. FIG. 5 illustrates an example of a display showing unrecognized characters when the every character is not recognized. While the characters are displayed as in FIGS. 4 and 5, if there is/are any miss-recognized character or characters, it is possible to correct it/them by marking the character and using sound input.

<Recording Process>

The record processing program written in the program RAM is explained with reference to FIGS. 6 to 9.

The digital electronics camera can be utilized as a recording apparatus capable of performing the following recording process. As shown in FIG. 1, the digital electronics camera according to the embodiment has a record operational unit 16 which comprises a character recognition mode setting button 18, the switch button 17 for initiating a release operation, and an external liquid crystal display (LCD) 19 for displaying the mode or the like.

When the mechanical and operational unit control CPU 4 detects the activation of the character recognition mode setting button 18 of the record operational unit 16, in order to indicate that the present image pickup mode is character pickup mode on the external LCD 19, the first two letters of "character", namely "CH", are displayed, for instance. When another activation of the character recognition mode setting button 18 is detected, then the CPU 4 instructs to stop displaying "CH", thereby a user is informed that the character pickup mode is released.

When the release button 17 of the record operational unit 16 is pressed while the character pickup mode is not set, the camera records an image under an file name composed of an ordinal number placed after "IMAG", for example. An alternative way to name a file is to add an expansion letters, such as ".IMAG", to emphasis that the file is an image file. In this way, as more images are picked-up, files of images are named as "IMAG0001.IMAG", "IMAG0002.IMAG", "IMCAG0003.IMAG", "IMAG0004.IMAG", and so on. Where the release button 17 of the record operational unit 16 is pressed while the character pickup mode is set, the camera records an image under an file name composed of an ordinal number placed after "IMCH", for example. According to this way, as more images are picked-up, files of images are named as "IMCH0001.IMAG", "IMCH0002.IMAG", "IMCH0003.IMAG", "IMCH0004.IMAG", and so on. It should be noted that the respective ordinal numbers can be separately added at each end of "IMAG" and "IMCH", or can be placed in picked-up order regardless of the kinds of the files.

As described above, files are stored under distinguishable file names, and flags indicative of the existence of the character mode in the files are inserted in the file. The data in the files are stored in proper area in various data formats, such as formats of TIFF and JPEG. For example, in a JPEG data format, there is a field for storing information characterized by application, such as character recognition and character pickup.

Figure 6:
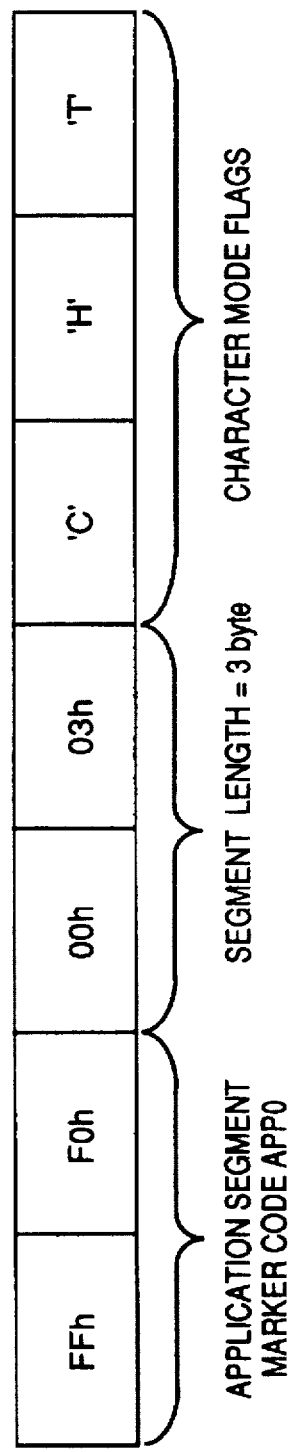
FIG. 6 illustrates an example of data format inside of a file when a flag is inserted there in a case where JPEG method is applied.

More specifically, as shown in FIG. 6, at the end of the application segment marker code APPO, there are added data which indicates a segment length (a segment length excluding a marker code and a length of segment length itself, three bytes in the embodiment) and an ASCCI character segment, such as two characters, "C" and "H", and a character "T" or "F" indicating "on" or "off". When a personal computer is used to search a file, the flag of the segment can be checked to determine whether or not to perform character recognition. This method is programmed in the signal processor control CPU 13 in FIG. 1.

Next, an operation of the record processing program according to the embodiment is described with reference to a flowchart in FIG. 7.

Figure 7:
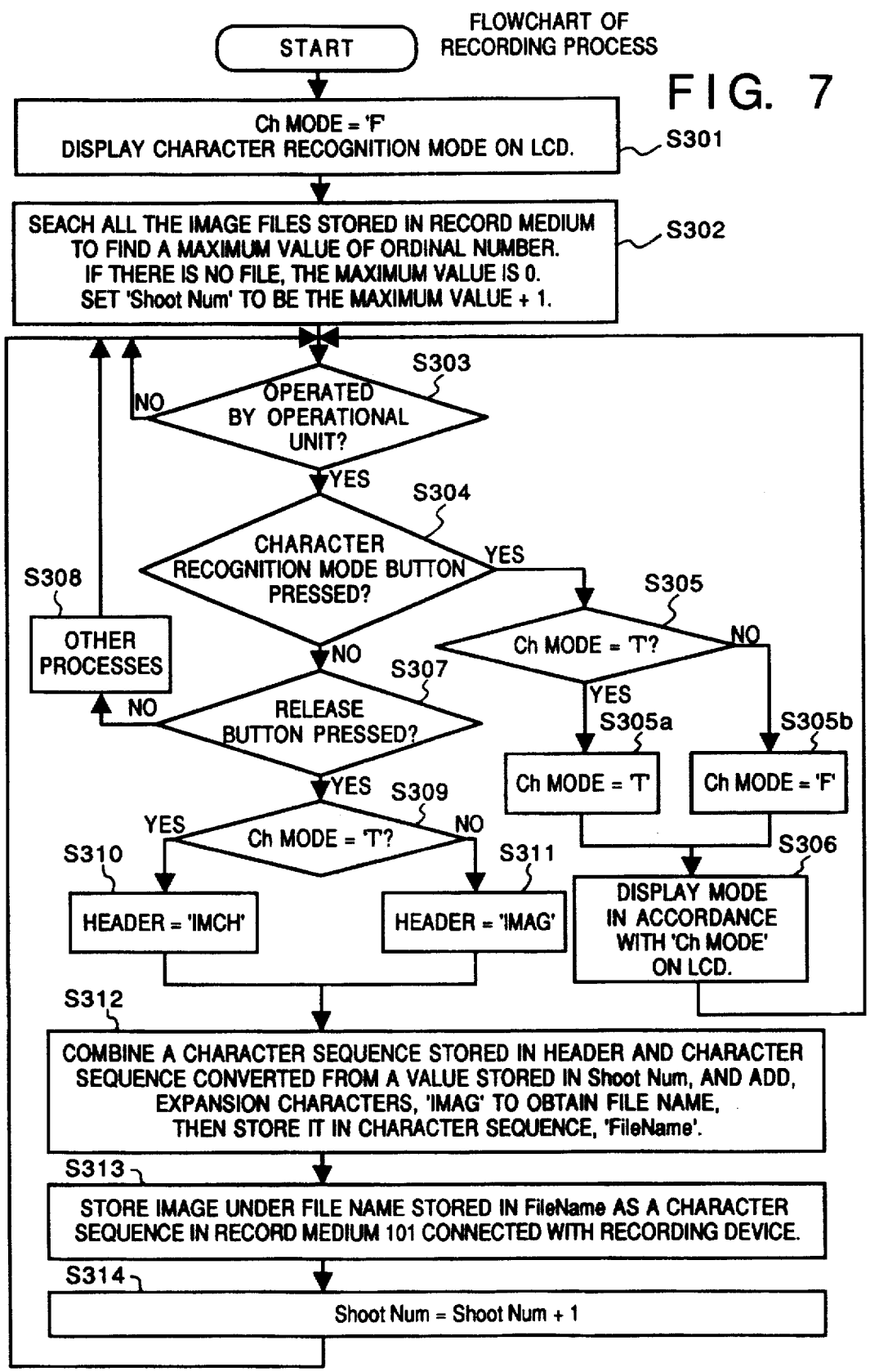
FIG. 7 is a flowchart for describing a recording process according to the embodiment.

Regarding variables used in the flowchart in FIG. 7, 'ShootNum' refers assigned number to the newest picked-up image where the numbers are given to images in picked-up order, 'ChMode' refers a mode showing a character recognition mode ('T' for character recognition mode, 'F' for otherwise), 'FileName' refers a variable length character sequence for storing a file name when an image is recorded, and 'Header' refers a temporary variable for a character sequence for setting the 'FileName'.

The process after power on will be explained below.

After the process starts, at step S301, ChMode is set to F showing that the apparatus is not in the character recognition mode. If the mode is set to the character recognition mode, the mode is displayed on an external LCD, however in this case, nothing is displayed since the mode is not the character recognition mode.

Next at step S302, the maximum file number value is searched by sorting ordinal numbers of image files which exist in the record medium. In this process, when the record medium is attached at the first time, the record medium is actually searched, however, after it is searched once, the latest ordinal number is recorded on the record medium, or an over-writable ROM, such as EEPROM in the CPU 13. By using the number unless detecting detachment of the record medium, a time for searching files can be shortened. Further, when a file does not exist, the value is set as 0. Then the variable, ShootNum, is initialized to the maximum value +1.

At step S303, the operation of the button on the record operational unit 16 by a user is observed. When an operation is detected, the process moves to step S304.

At step S304, an operation of the button 18 for the character recognition mode is awaited, and when any operation is detected, the process proceeds to step S305. If the character recognition mode is "T", then the process moves to step S305a, if not, the process moves to step S305b, and further proceeds to step S306, whereat the character recognition mode and the display of the mode are changed. Whereas, when the button 18 is detected that it is not pressed at step S304, the process proceeds to step S307, and a release operation is checked. In a case where the release operation is not detected, the process moves to step S308, and other necessary processes are performed, the process returns to step S303.

If a release button 17 is detected at step S307, the process moves to step S309 and further moves to step S310, or the process moves to step S309 and further moves to step S311. There, the header of the file name is set either 'IMAG' or 'IMCH' depending on the ChMode detected at step S309, then at step S312, the variable for FileName showing the file name is determined by conjugating 'IMAG' or 'IMCH' with a header converted from 'ShootNum'. Then at step S313, an image file is stored in the record medium in correspondence with the character sequence stored in the FileName variable as the file name. At this time, a flag which indicates being a file for character recognition is also stored in accordance with the ChMode.

When the recording is over, the process moves to step S314 where the variable of ShootNum is incremented by 1 for the next recording.

The image file made in the aforementioned recording process clearly distinguishes an ordinary natural image and an image shot for character recognition by using the file names. Therefore, a user can easily distinguish a kind of file of image shot by a camera and stored in a record medium by using a user interface of a personal computer.

Further, since a flag showing that an image is taken in the character recognition mode is also stored in the file, it is possible for a personal computer to automatically select files for the character recognition along with confirming file names and the flags by executing an application, and to process character recognition. The application can be a software executed by a personal computer. A flowchart showing a process of an application, such as the aforesaid application, is illustrated in FIG. 8.

Figure 8:
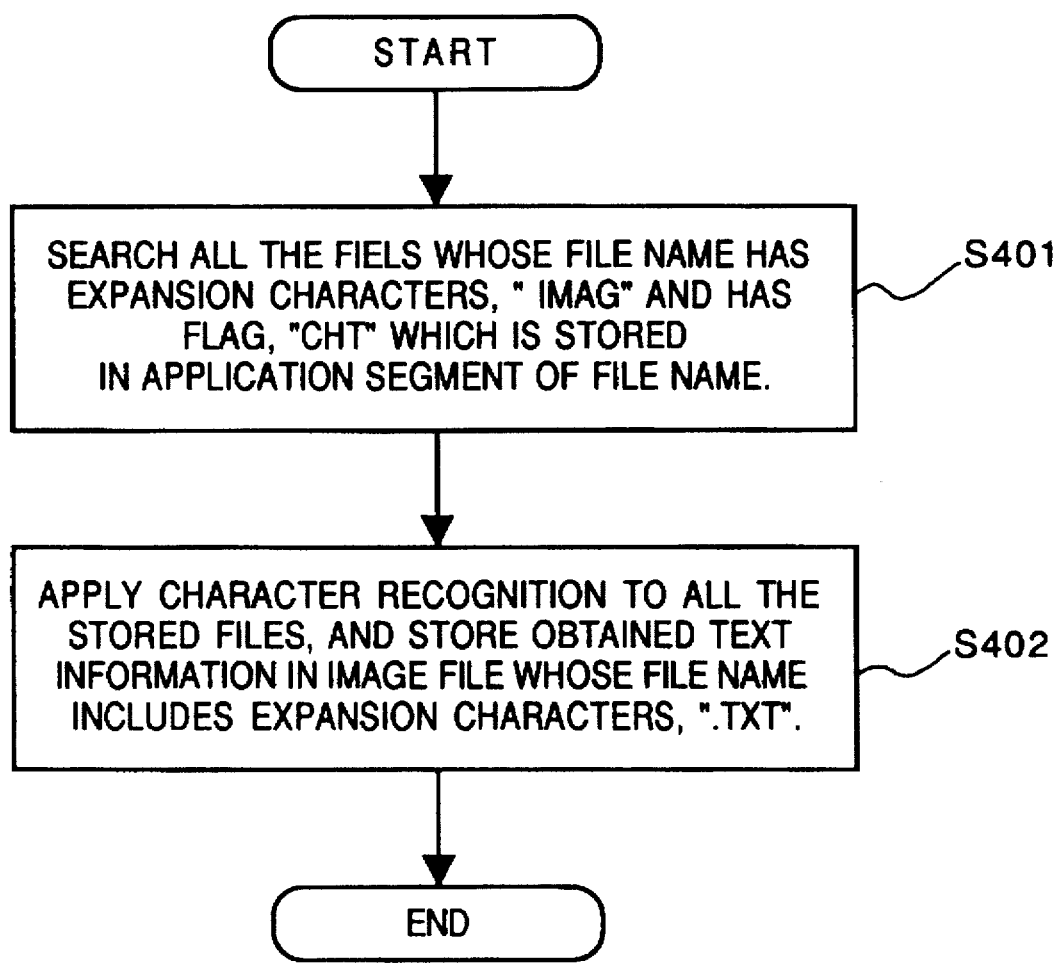
FIG. 8 is a flowchart describing the character recognition process along with an automatic selection process of files when the processes are performed simultaneously according to the embodiment.

In FIG. 8, after the process starts, all the files having expansion characters, '.IMAG', which is added to the file names, and the flag for character recognition, 'CHT', which is stored in an internal application segment are searched at step S401. Then at step S402, character recognition process is applied on all the files searched, and the character recognition results are outputted as text files. At this time, all the obtained text files are stored under file names of the image files having expansion characters, '.TXT', in a record medium. As a result of this process at step S402, indications, such as, 'IMCH$$$$.TXT' are used to express a text file name so as to show that the file contains a recognition result of an 'IMCH$$$$.IMAG' file, where $$$$ is a character sequence showing an assigned number to a file as an ordinal number.

Further, by executing the process in FIG. 8, it becomes possible to search character sequences in file names, 'IMCH$$$$.TXT', of a plurality of text information files which are results of the automatic character recognition, therefore, image information of originals of the text information and image information shot before and after the original can be searched. Such a program capable of making the apparatus perform the aforesaid operations can be software executed by a personal computer. A flowchart illustrating major process performed by executing such application is shown in FIG. 9.

Figure 9:
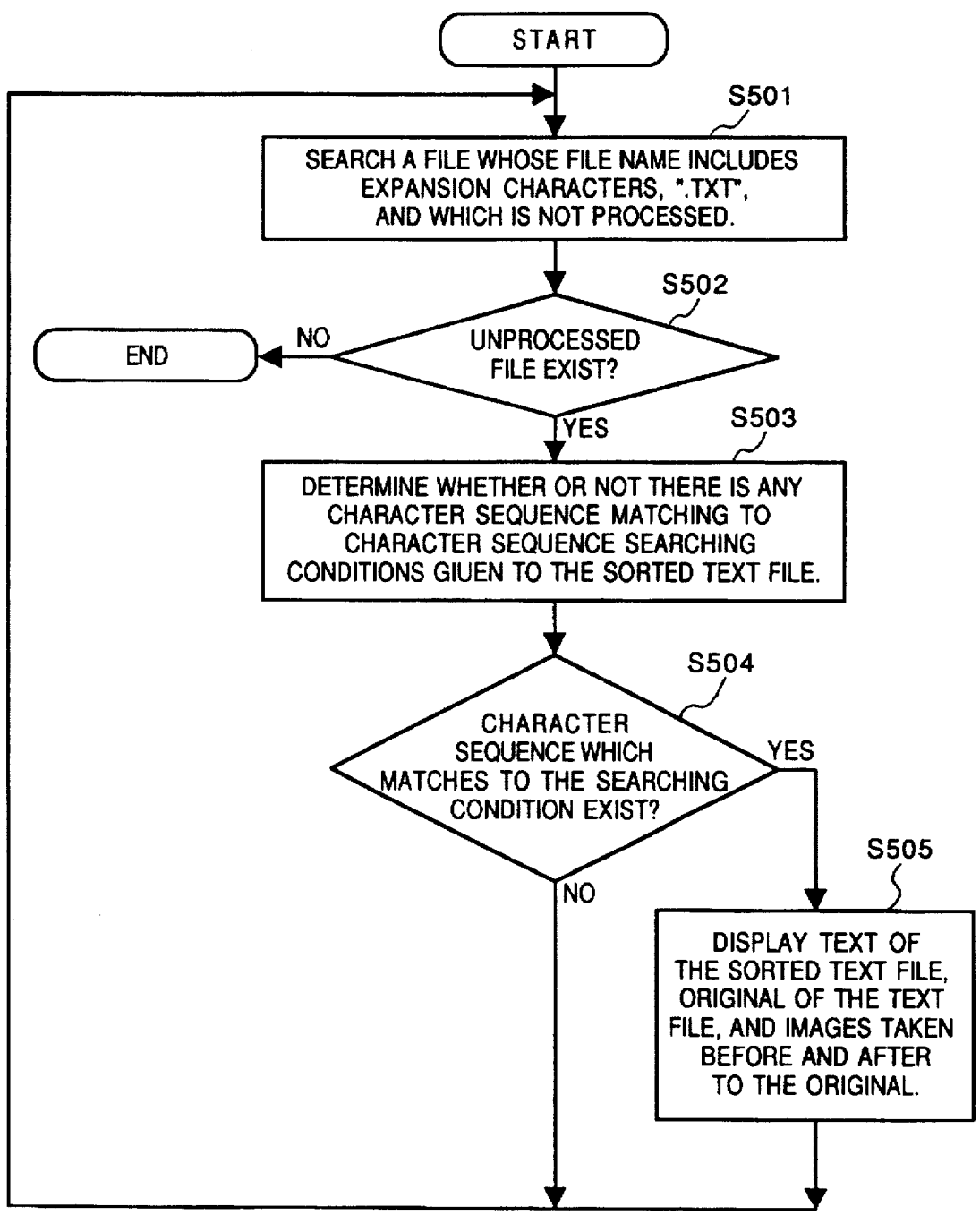
FIG. 9 is a flowchart describing a process which compares character sequences in accordance with file information obtained through character recognition, and which sort files which are relate to each other.

In FIG. 9, after the process starts, files having the expansion charactors '.TXT'' in their file names and being not processed are searched at step S501. Then, if any unprocessed file is detected for at step S502, the process proceeds to step S503, and text information of the file is checked whether or not there is any character sequence which matches to character sequence of the search conditions. At step S504, if it is determined that a character sequence matches to the character sequence of the search conditions, the process moves to step S505.

At step S505, the file name of the original image is displayed by replacing expansion characters of the sorted text file name by '.IMAG'. Then the original image file and the image files which are stored before and after the original file are displayed along with text file information of which the expansion characters match with the ones of the original. These before and after files can be easily searched by using the ordinal picked-up numbers of the files. For example, if a name of a searched character recognized file is 'IMCH0045.TXT', its original image file name must be 'IMCH0045.IMAG', and the previous image file names must be 'IMCH0044.IMAG', 'IMAG0044.IMAG', further the next image file names must be 'IMCH0046.IMAG', 'IMAG0046.IMAG'. When a character sequence which matches to the character sequence search conditions is not detected at step S504, and when the process at step 505 is completed, the process returns to step S501.

<Modified Example>

In the above-described embodiment, a recording operation of a case where the character recognition mode is set before the shooting of an image by a camera is described, the digital electrical camera can be used as a replaying apparatus. In that case, the camera is constructed so that a device, such as an electric view finder (EVF), is attached to replay an image, accordingly it is possible to change a file name of the image into a file name for character recognition after a user checks the content by replaying the picked-up image, as well as to set a flag. In that case, file name and a flag in the file can be changed when the character recognition mode button on the record operating unit is pressed for a predetermined time period in replay mode.

As explained above, in the digital electronic still camera according to the embodiment, recorded image files are given names which can clearly distinguish ordinary natural image files from image files for character recognition, therefore, a user can easily distinguish the kinds of files by using a personal computers or the like.

Further, only files having generated flags for character recognition can be sorted, thus it is possible for a computer to automatically execute the character recognition, which results in reducing character recognition jobs by a user. Furthermore, character sequences of the automatically character recognized text information can be searched, and image information which are the original of the text information and information on images picked-up before and after the original image can also be sorted and displayed.

The present invention can be applied to a system constituted by a plurality of devices, or to an apparatus comprising a single device. Furthermore, the invention is applicable also to a case where the object of the invention is attained by supplying a program to a system or apparatus.

For example, in the embodiment and the modified example as explained above, the ordinary image and the image for character recognition are distinguished by their file names, however, by changing names of sub directory which stores image files of each mode, the same object can be achieved without distinguishing by file names.

Further, in the above-described embodiment, character recognition mode on the camera is displayed on the LCD, however, a light emitting element (e.g., LED) of certain color can be set inside of a finder of the camera.

Further, since it is possible to record an image for character recognition in fewer tone levels, capacity to record the image can be reduced dramatically. In that case, after the image for character recognition is converted into a binarized image, it is recorded by applying run-length compression.

Further, in the aforesaid embodiment, the character recognition process is automatically executed by a personal computer, however, the process is not limited to execution by a personal computer. For example, it is possible to apply to an application which distinguishes files transmitted as by electric mail. Furthermore, a plurality of flags, such as character recognition and transmission, can be inserted. In this case, an apparatus is constructed, for instance, so that the ordinary mode, the character recognition mode, and transmission mode are selected by pressing the button 18 shown in FIG. 1, as a mode selection button, for different number of times for each mode, and an external LCD displays no mode, mode display:CH, or mode display:TX in accordance with the selected mode. Thus, flags stored in a file are 'CHT' and 'CHF' for designating the character recognition mode, and 'TXT' and 'TXF' for designating the transmission mode, where 'TXT'0 and 'TXF' indicates 'transmission mode ON' and 'transmission mode OFF', respectively.

The present invention is not limited to the above embodiments and various changes and modifications can be made within the spirit and scope of the present invention. Therefore, to apprise the public of the scope of the present invention the following claims are made.

What is claimed is:

1. An image pickup apparatus having a camera which converts an object image into object image data, comprising:
   recording means for recording the object image data;
   connecting means for connecting a unit having a signal processing circuit which processes the object image data stored in said recording means; and
   a branching means for determining either the camera or said recording means from which the object image data is transmitted via said connecting means when the unit is connected.

2. The image pickup apparatus according to claim 1, wherein the unit is constructed to be detachable and attached via said connecting means to the camera, and has character recognition means for converting a character included in the object image data to character data.

3. The image pickup apparatus according to claim 2 further comprising means for calculating a recognition ratio of all characters included in the image data on the basis of a recognition result by the recognition means and for setting image pickup conditions of the object so that the recognition ratio becomes a maximum value.

4. The image pickup apparatus according to claim 2, wherein said character recognition means displays at least two kinds of image data out of image data based on a picked-up image, image data as a recognition result, and an image data in a character recognition process.

5. The image pickup apparatus according to claim 4, wherein the image data in the character recognition process is binary data.

6. The image pickup apparatus according to claim 2, wherein the unit includes a RISC CPU capable of high speed processing.

7. An image pickup apparatus having a camera which encodes sound data, comprising:

recording means for recording the sound data;

connecting means for connecting with a unit having a signal processing circuit which encodes the sound data stored in said recording means; and a branching means for determining either the camera or said recording means from which the sound data is transmitted via said connecting means when the unit is connected.

8. The image pickup apparatus according to claim 7, wherein the unit is constructed to be detachable and attached via said connecting means to the camera, and has sound recognition means for converting the sound data into character data.

9. The image pickup apparatus according to claim 7, wherein the unit is constructed to be detachable and attached via said connecting means to the camera, and having character recognition means for converting a character included in an object image data to character data.

10. The image pickup apparatus according to claim 9 further comprising means for calculating the ratio of the number of recognized characters to total number of to be recognized characters included in the object image data on the basis of a recognition result by the recognition means and for setting image pickup conditions of an object so that a recognition ratio becomes a maximum value.

11. The image pickup apparatus according to claim 9, wherein said character recognition means displays at least two kinds of image data out of image data based on a picked-up image, image data as a recognition result, and an image data in a character recognition process.

12. The image pickup apparatus according to claim 11, wherein the image data in the character recognition process is binary data.

13. The image pickup apparatus according to claim 10, wherein, when the recognition ratio shows the maximum value and all the characters are not recognized, the character recognition means displays unrecognized characters of the object image data.

14. The image pickup apparatus according to claim 13, wherein the unrecognized characters of the object image data is changed by pronouncing correct character and by converting the pronounced character into the character data.

15. The image pickup apparatus according to claim 7, wherein the unit includes a RISC CPU capable of high speed processing.

16. An image pickup apparatus taking sound data as well as image data, comprising:

image processing means for converting the image data into digital data;

sound processing means for converting the sound data into digital data, wherein the digitized image and sound data are combined and recorded; and a detachable unit which can be connected to a camera comprising said image processing means and said sound processing means via connecting means provided on the camera, wherein said unit has sound recognition means for converting the sound data into character data.

17. The image pickup apparatus according to claim 16, wherein the unit has character recognition means for converting a character in the image data to character data.

18. The image pickup apparatus according to claim 17 further comprising means for calculating a recognition ratio of all characters included in the image data on the basis of a recognition result by the character recognition means and for setting image pickup conditions of an object so that the recognition ratio becomes a maximum value.

19. The image pickup apparatus according to claim 18, wherein said character recognition means displays at least two kinds of image data out of image data based on a picked-up image, image data as the recognition result, and an image data in a character recognition process.

20. The image pickup apparatus according to claim 19, wherein the image data in the character recognition process is binary data.

21. The image pickup apparatus according to claim 18, wherein, when the recognition ratio shows the maximum value and all characters are not recognized, the character recognition means displays unrecognized characters of the image data.

22. The image pickup apparatus according to claim 21, wherein the unrecognized characters of the image data is changed by pronouncing correct character or characters and by converting the pronounced character or characters into the character data.

23. The image pickup apparatus according to claim 16, wherein the unit includes a RISC CPU capable of high speed processing.

24. An image pickup apparatus taking sound data as well as image data, comprising:

image processing means for converting the image data into digital data;

sound processing means for converting the sound data into digital data, wherein the digitized image and sound data are combined and recorded; and a detachable unit which can be connected to a camera comprising said image processing means and said sound processing means via connecting means provided on the camera, wherein said unit includes a RISC CPU capable of high speed processing.

25. The image pickup apparatus according to claim 24, wherein said unit has sound recognition means for converting the sound data into character data.

26. The image pickup apparatus according to claim 24, wherein the unit has character recognition means for converting a character in the image data to character data.

27. The image pickup apparatus according to claim 26 further comprising means for calculating a recognition ratio of all characters included in the image data on the basis of a recognition result by the recognition means and for setting image pickup conditions of an object so that the recognition ratio becomes a maximum value.

28. The image pickup apparatus according to claim 27, wherein said character recognition means displays at least two kinds of image data out of image data based on a picked-up image, image data as a recognition result, and an image data in a character recognition process.

29. The image pickup apparatus according to claim 28, wherein the image data in the character recognition process is binary data.

30. The image pickup apparatus according to claim 27, wherein, when the recognition ratio shows the maximum value and all characters are not recognized, the character recognition means displays unrecognized characters of the image data.

31. The image pickup apparatus according to claim 30, wherein the unrecognized characters of the image data is changed by pronouncing correct character or characters and by converting the pronounced character or characters into the character data.

32. An image pickup apparatus having a camera which converts an object image into object image data, comprising:
   recording means for recording the object image data;
   connecting means for connecting a unit having a signal processing circuit which processes the object image data stored in said recording means; and
   a switching means for switching either the camera or said recording means from which the object image data is transmitted via said connecting means when the unit is connected.

33. The image pickup apparatus according to claim 32, wherein the unit is constructed to be detachable and attached via said connecting means to the camera, and has character recognition means for converting a character included in the object image data to character data.

34. The image pickup apparatus according to claim 33 further comprising means for calculating a recognition ratio of all characters included in the image data on the basis of a recognition result by the recognition means and for setting image pickup conditions of the object so that the recognition ratio becomes a maximum value.

35. The image pickup apparatus according to claim 33, wherein said character recognition means displays at least two kinds of image data out of image data based on a picked-up image, image data as a recognition result, and an image data in a character recognition process.

36. The image pickup apparatus according to claim 35, wherein the image data in the character recognition process is binary data.

37. The image pickup apparatus according to claim 33, wherein the unit includes a RISC CPU capable of high speed processing.

* * * * *